Sept. 28, 1937.   M. G. HORNE ET AL   2,094,430
TRANSFER
Filed Oct. 15, 1934

Maurice George Horne
Mario Borone
Inventors
their Atty.

Patented Sept. 28, 1937

2,094,430

UNITED STATES PATENT OFFICE 2,094,430

TRANSFER

Maurice George Horne and Mario Barone, London, England

Application October 15, 1934, Serial No. 748,350
In Great Britain October 17, 1933

4 Claims. (Cl. 41—33)

This invention relates to transfers.

One object of the invention is to provide a transfer in which the transferable matter is face uppermost.

A further object of the invention is to provide a transfer which is simple and cheap to manufacture and which can be employed with ease even by most unskilled persons.

Still a further object of the invention is to provide a transfer, the transferable matter of which can be applied to the surface to be decorated by means of the same adhesive as that which secures said transferable matter to the backing.

Still a further object of the invention is to provide a transfer of such a nature that when the transferable matter has been transferred it needs no subsequent application of a protective lacquer or the like coating.

Still a further object of the invention is to provide a transfer in which the transferable matter after having been applied to the surface to be decorated can only be removed again with a maximum of difficulty.

Further objects and advantages of the invention will become apparent from the following description thereof:

In one embodiment of transfer according to the invention, the transferable matter is not applied direct to the layer of water-soluble adhesive, but a layer of cellulose derivative is first applied to said adhesive layer and the transferable matter applied to said layer of cellulose derivative, and then coated with the outer protective layer of cellulose derivative, the transferable matter being thus sandwiched between two layers of cellulose derivative.

The outer cellulose derivative protective layer slightly overlaps the transferable matter or the cellulose derivative coating on which said transferable matter has been printed whereby an edge-sealing effect as will hereinafter be more fully described, is obtained and a firm and durable adhesion of the transferable matter to the surface to be decorated is obtained.

In order to facilitate comprehension of the invention, reference will be made to the accompanying drawing which illustrates diagrammatically and by way of example certain methods of making transfers in accordance therewith and in which:—

Figures 1, 2:
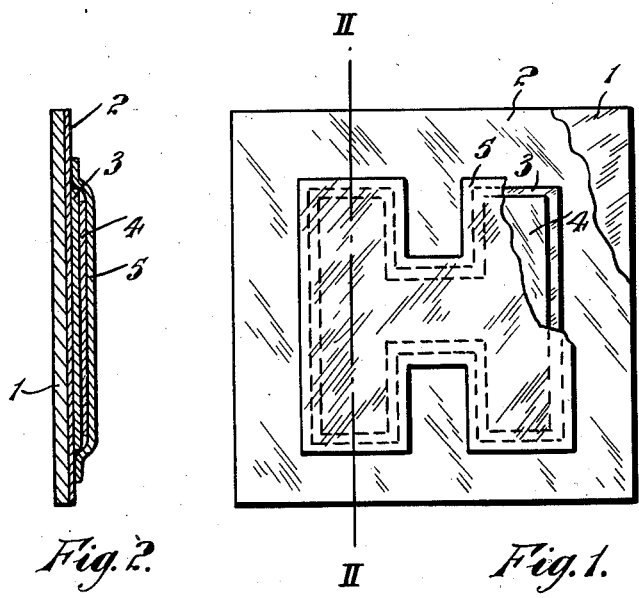
Fig. 1 is a top plan view, partly broken away of one and embodiment of transfer.
Fig. 2 is a section on the line II—II of Fig. 1.

In one method of making transfers in accordance with the invention as illustrated in Figs. 1 and 2, a backing 1 is selected which consists of a water-permeable material such as semi-porous paper which is sufficiently thin and porous to prevent it curling when the adhesive is applied. The porosity of the backing should be sufficient to allow the water to permeate the same easily when immersed in water, but the texture of the backing should be sufficiently close to prevent the free flow of air therethrough in order to prevent oxidation or deterioration of the adhesive coated thereonto.

A layer 2 of suitable adhesive such as gelatine or other preferably hardenable substance is thereupon applied to the base 1. The thickness of the coating of adhesive is preferably of the order of 0.003 inch.

The adhesive layer 2 is next coated with a cellulose derivative layer 3 (the composition of which will be later more fully described).

When the coating of adhesive 2 and the cellulose derivative layer 3 have dried, the transferable matter 4 is printed thereon by lithography or letter-press printing or by the silk screen process. If metallic colours are employed for the printing they may be mixed in proportions according to the density required with spirit varnish or a cellulose medium. Alternatively cellulose colours (i. e. cellulose derivative solutions having pigments dispersed therein) may also be used, being printed on in the same manner.

The colours constituting the transferable matter are essentially constituted by light fast pigments in a lacquer medium. The pigment or pigment mixture may be first ground in castor oil or any other softener or plasticizer or mixture of the two and then added to a clear cellulose lacquer medium.

The transferable matter 4 after having dried is next coated with a protective coating of cellulose derivative lacquer 5 in such a way that a narrow marginal portion thereof overlaps the outlines of the layer 3 and the transferable matter 4. The protective cellulose derivative layer is allowed to dry whereupon the transfer is ready for use.

Figure 3:
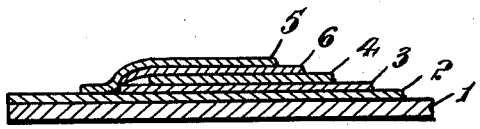
Fig. 3 is a fragmentary section of a further embodiment.

In the embodiment illustrated in Fig. 3, the layer of transferable matter 4 is first coated with a layer 6 impervious to cellulose derivative solvents and consisting for example of a spirit varnish, whereupon there is applied to said layer 6 the protective cellulose derivative layer 5 in the same manner as in the previous embodiment.

The cellulose derivative lacquer preferably consists of the following ingredients, namely, high viscosity nitrocellulose, low viscosity nitrocellulose, blown castor oil, amyl phthalate, acetone, amyl acetate, ethylene glycol ethyl ether, xylene, n-butyl alcohol and petroleum spirit, preferably in the proportions specified below:—

| | | |
|---|---|---|
| High viscosity nitrocellulose | grammes | 300 |
| Low viscosity nitrocellulose | do | 300 |
| Blown castor oil | do | 150 |
| Diamyl phthalate | do | 150 |
| Acetone | c. c. | 400 |
| Amyl acetate | centilitres | 800 |
| Ethylene glycol ethyl ether | do | 400 |
| Xylene | do | 400 |
| n-Butyl alcohol | do | 240 |
| Petroleum spirit | do | 1100 |

The method of preparing lacquers of this kind is well known in the art and it will therefore be unnecessary to explain in detail the preparation of the lacquer.

An important feature of the present invention resides in the fact that the protective cellulose derivative layer slightly overlaps the edges of the transferable matter or of the lower cellulose derivative layer. In practice, it is preferable to make the lower cellulose derivative layer conform in shape to the outline of the printed transferable matter and to arrange that the edges of the protective cellulose derivative layer shall have substantially the same configuration, but project slightly beyond the printed matter and the lower cellulose derivative layer. This overlapping of the edge of the protective layer ensures an extremely firm adhesion of the transferable matter after application to the surface to be decorated which is resistant to weathering, wind, rain, etc. It moreover renders it extremely difficult to lift the edges of the transferable film from the decorated surface. It is of course understood that the adhesive layer should extend beyond the overlapping edges of the protective layer and in practice, the whole of the backing is coated with adhesive.

One method of applying the transfer from one base to another surface is the following:

The transfer, which as previously explained, should show uppermost the surface which is exposed to the weather and/or air when the transfer has been applied to the surface to be ornamented, is dipped in water. The semi-porous base allows the water to freely penetrate the backing and loosen the adhesive. The transfer film is then slid sideways from the semi-porous backing or is pulled off and dipped into a solution adapted to harden the adhesive. Thus, for example, if gelatine be employed as adhesive, the film is dipped into a dilute solution of formaldehyde. Owing to its inherent mechanical strength, the transfer is easily slid off its base or otherwise handled without being damaged; as a matter of fact it can be rolled into a small ball and spread out again without any damage. The transfer with the adhesive and hardening agent is then placed on the surface to be ornamented, for example a glass window, and is lightly pressed down by a squeegee, or roller, or by hand and on drying it will firmly adhere to the new base.

Owing to the overlapping edge of the cellulose derivative film free from colour or other insoluble admixture, the transfer film will firmly adhere to the new base. The hardening solution will quickly harden the adhesive and will cause the transfer to firmly adhere to the new base, and the edge-sealing will prevent moisture or air from entering between the transfer and the new base.

If it is intended to apply the transfer for example inside a glass window and to ensure that the uppermost surface of the transfer remains uppermost on the surface on which is placed the letters, designs, pictures and the like are printed or applied in reverse or alternatively the transferable matter may be printed right side up on the underside of the upper protective cellulose derivative layer.

In some cases the overlapping edges can be dispensed with.

We claim:—

1. A transfer comprising in combination, a pervious backing, a layer of water-soluble adhesive, a layer of cellulose derivative, a layer of transferable matter on said cellulose derivative layer, said cellulose derivative layer conforming substantially to the outline of said layer of transferable matter, said transferable matter bearing the same relation to the backing as to the surface to which it is subsequently applied, a protective layer of cellulose derivative on said layer of transferable matter, said last mentioned protective cellulose derivative layer conforming substantially to the outer contour of said layer of transferable matter and of said first mentioned cellulose derivative layer, but having a narrow marginal portion overlapping the outlines both of said layer of transferable matter and of said first mentioned cellulose derivative layer.

2. A transfer comprising in combination, a pervious backing, a layer of water-soluble adhesive, a layer of cellulose derivative, a layer of transferable matter on said cellulose derivative layer, a layer impervious to cellulose derivative solvents on said layer of transferable matter and a protective layer of cellulose derivative on said impervious layer, said protective cellulose derivative layer conforming substantially to the outer contour of said layer of transferable matter, but overlapping same.

3. A transfer comprising in combination, a pervious backing, a layer of water-soluble adhesive, a layer of cellulose derivative, a layer of transferable matter on said cellulose derivative layer, a layer impervious to cellulose derivative solvents on said layer of transferable matter, and a protective layer of cellulose derivative on said impervious layer, said last mentioned protective cellulose derivative layer conforming substantially to the outer contour of said first mentioned cellulose derivative layer, but overlapping said first mentioned cellulose derivative layer.

4. A transfer comprising in combination, a pervious backing, a layer of water-soluble adhesive, a layer of cellulose derivative, a layer of transferable matter on said cellulose derivative layer, a layer of spirit varnish on said layer of transferable matter, and a protective layer of cellulose derivative on said spirit varnish layer, said last mentioned protective cellulose derivative layer conforming substantially to the outer contour of said first mentioned cellulose derivative layer, but overlapping said first mentioned cellulose derivative layer.

MAURICE GEORGE HORNE.
MARIO BARONE.